(12) United States Patent  (10) Patent No.: US 7,710,676 B1
Chue  (45) Date of Patent: May 4, 2010

(54) DISK DRIVE COMPRISING GRAY CODE IMPLEMENTED WITH SERVO BURSTS

(75) Inventor: Jack M. Chue, Los Altos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/057,213

(22) Filed: Mar. 27, 2008

(51) Int. Cl.
*G11B 5/09* (2006.01)
*G11B 5/596* (2006.01)

(52) U.S. Cl. ............... 360/49; 360/48; 360/77.08
(58) Field of Classification Search ............ None
See application file for complete search history.

(56) References Cited

U.S. PATENT DOCUMENTS

| | | | |
|---|---|---|---|
| 4,879,612 A * | 11/1989 | Freeze et al. | 360/78.06 |
| 5,274,510 A * | 12/1993 | Sugita et al. | 360/49 |
| 5,381,281 A | 1/1995 | Shrinkle et al. | |
| 5,600,499 A | 2/1997 | Acosta et al. | |
| 5,862,005 A * | 1/1999 | Leis et al. | 360/27 |
| 5,903,410 A | 5/1999 | Blaum et al. | |
| 6,049,438 A | 4/2000 | Serrano et al. | |
| 6,141,176 A | 10/2000 | Blaum et al. | |
| 6,243,223 B1 | 6/2001 | Elliott et al. | |
| 6,288,861 B1 | 9/2001 | Blaum et al. | |
| 6,452,990 B1 | 9/2002 | Leis et al. | |
| 6,496,312 B2 | 12/2002 | Blaum et al. | |
| 6,590,729 B1 | 7/2003 | Akagi et al. | |
| 6,614,609 B1 | 9/2003 | Reed et al. | |
| 6,775,081 B2 | 8/2004 | Ottesen et al. | |
| 6,856,480 B2 | 2/2005 | Kuki et al. | |
| 6,961,203 B1 | 11/2005 | Baker | |
| 7,027,257 B1 | 4/2006 | Kupferman | |
| 7,068,461 B1 | 6/2006 | Chue et al. | |
| 7,099,095 B1 | 8/2006 | Subrahmanyam et al. | |
| 7,167,329 B2 | 1/2007 | Baker | |
| 7,209,314 B2 | 4/2007 | Bandic et al. | |
| 7,236,325 B2 | 6/2007 | Albrecht et al. | |
| 7,242,546 B2 | 7/2007 | Ooi et al. | |
| 2003/0035239 A1 | 2/2003 | Ottesen | |
| 2007/0211370 A1* | 9/2007 | Ryu et al. | 360/77.08 |
| 2008/0002278 A1 | 1/2008 | Ueda et al. | |

OTHER PUBLICATIONS

A. H. Sacks, "Position Signal Generation in Magnetic Disk Drives," Ph.D. thesis, Carnegie Mellon University, Data Storage Systems Center, Department of Electrical and Computer Engineering, Carnegie Mellon University, Pittsburg, PA, Sep. 5, 1995.

* cited by examiner

*Primary Examiner*—Andrew L Sniezek

(57) ABSTRACT

A disk drive is disclosed comprising a disk including a plurality of servo tracks defined by a plurality of servo sectors, wherein each servo sector comprises a plurality of servo bursts. The disk drive further comprises a head actuated over the disk. A servo sector is read to generate a read signal which is processed to demodulate the servo bursts into a position error signal (PES) representing an offset of the head from a target radial location on the disk. The read signal is also processed to decode the servo bursts into a Gray codeword representing at least part of a servo track address, wherein the servo track address represents a servo track the head is over.

20 Claims, 6 Drawing Sheets

|  | A \| B | C \| D | PHASES | GRAY CODE |
|---|---|---|---|---|
| 1 | 0 | 0 | 0 \| 0 \| 90 | 000 |
|   |   | 90 | 0 \| 90 \| 90 | |
| 2 | 90 | 180 | 90 \| 90 \| 180 | 001 |
|   |   |   | 90 \| 180 \| 180 | |
| 3 | 180 | 270 | 180 \| 180 \| 270 | 011 |
|   |   |   | 180 \| 270 \| 270 | |
| 4 | 270 | 0 | 270 \| 270 \| 180 | 010 |
|   |   | 180 | 270 \| 0 \| 180 | |
| 5 | 0 | 270 | 0 \| 180 \| 270 | 110 |
|   |   |   | 0 \| 90 \| 270 | |
| 6 | 90 | 0 | 90 \| 270 \| 0 | 111 |
|   |   |   | 90 \| 180 \| 0 | |
| 7 | 180 | 90 | 180 \| 0 \| 90 | 101 |
|   |   |   | 180 \| 270 \| 90 | |
| 8 | 270 | 0 | 270 \| 90 \| 0 | 100 |
|   |   |   | 270 \| 0 \| 0 | |
| 1 | 0 | 90 | 0 \| 0 \| 90 | 000 |
|   |   |   | 0 \| 90 \| 90 | |
| 2 | 90 | 180 | 90 \| 90 \| 180 | 001 |
|   |   |   | 90 \| 180 \| 180 | |
| 3 | 180 | 270 | 180 \| 180 \| 270 | 011 |
|   |   |   | 180 \| 270 \| 270 | |
| 4 | 270 | 180 | 270 \| 270 \| 180 | 010 |
|   |   |   | 270 \| 0 \| 180 | |
| 5 | 0 | 270 | 0 \| 180 \| 270 | 110 |
|   |   |   | 0 \| 90 \| 270 | |
| 6 | 90 | 0 | 90 \| 270 \| 0 | 111 |
|   |   |   | 90 \| 180 \| 0 | |
| 7 | 180 | 90 | 180 \| 0 \| 90 | 101 |
|   |   |   | 180 \| 270 \| 90 | |
| 8 | 270 | 0 | 270 \| 90 \| 0 | 100 |
|   |   |   | 270 \| 0 \| 0 | |
| 1 | 0 | 90 | 0 \| 0 \| 90 | 000 |
|   |   |   | 0 \| 90 \| 90 | |
| 2 | 90 | 180 | 90 \| 90 \| 180 | 001 |
|   |   |   | 90 \| 180 \| 180 | |
| 3 | 180 | 270 | 180 \| 180 \| 270 | 011 |
|   |   |   | 180 \| 270 \| 270 | |

FIG. 4

DISK DRIVE COMPRISING GRAY CODE IMPLEMENTED WITH SERVO BURSTS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 4 as comprising a number of data tracks 6 defined by servo sectors $2_0$-$2_N$ recorded around the circumference of each data track. Each servo sector $2_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $2_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

The servo track addresses in the servo data 12 are typically implemented using a Gray code wherein a single bit changes between codewords that represent adjacent servo tracks. In this manner, the Gray coded track addresses can be detected and decoded unambiguously even when the head is between servo tracks, for example, during a seek operation. However, the Gray coded track addresses consume disk space that might otherwise be used for user data, thereby reducing the capacity of the disk drive.

BRIEF DESCRIPTION OF THE DRAWINGS

FIG. 4 shows an orthogonal phase servo pattern wherein the phases of the servo bursts are decoded into the Gray codeword.

DETAILED DESCRIPTION OF EMBODIMENTS OF THE INVENTION

Figure 1:
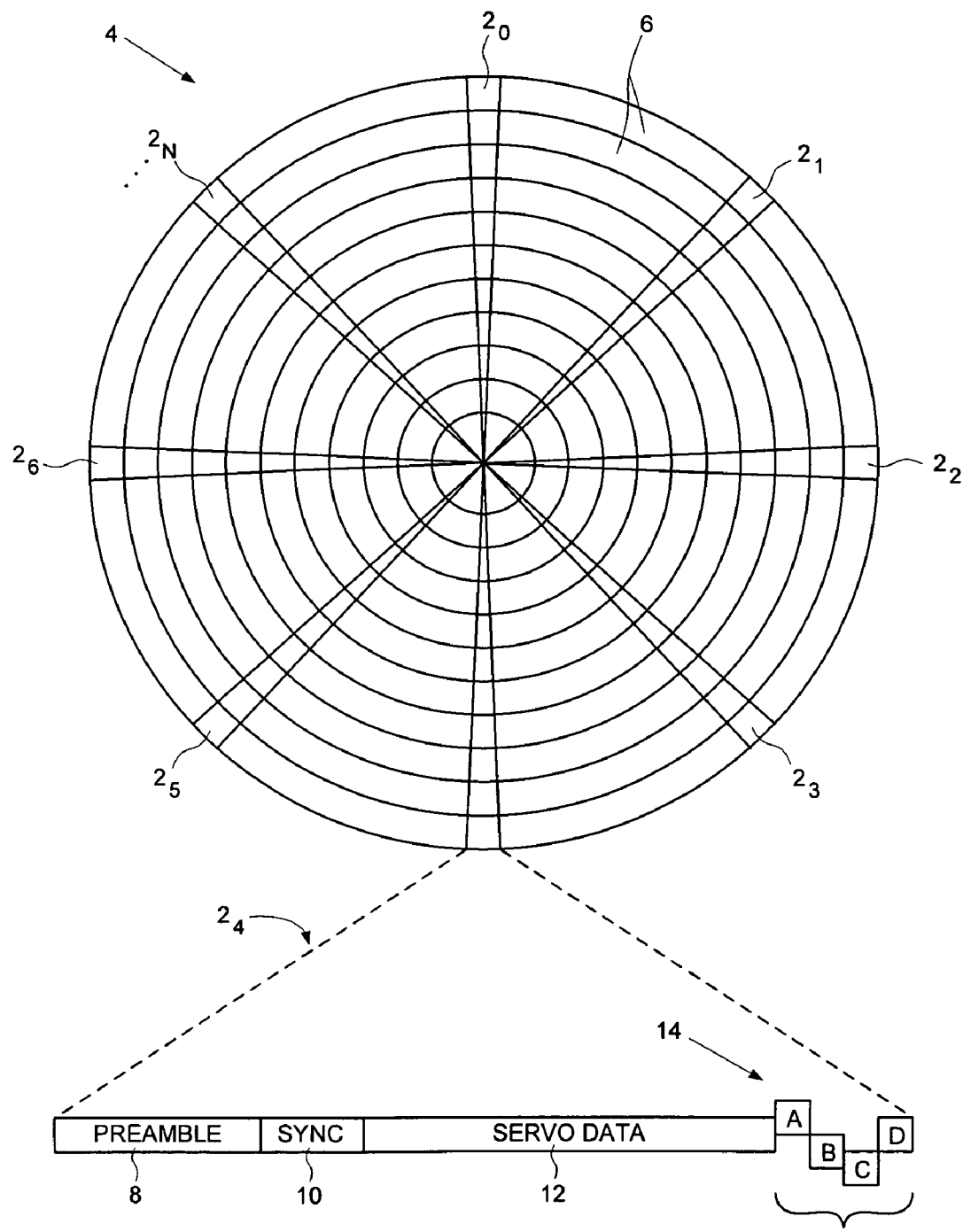
FIG. 1 shows a prior art disk format comprising a plurality of data tracks defined by a plurality of servo sectors.
Figure 2A:
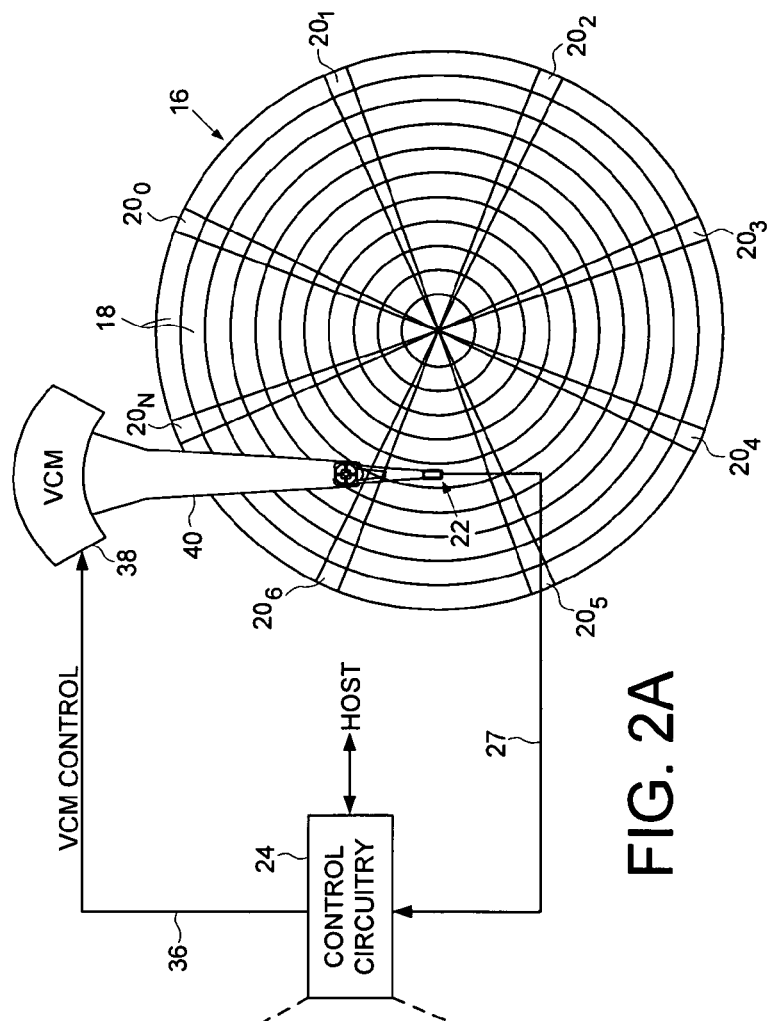
FIG. 2A shows a disk drive according to an embodiment of the present invention comprising a head actuated over the disk, and control circuitry.
Figure 2B:
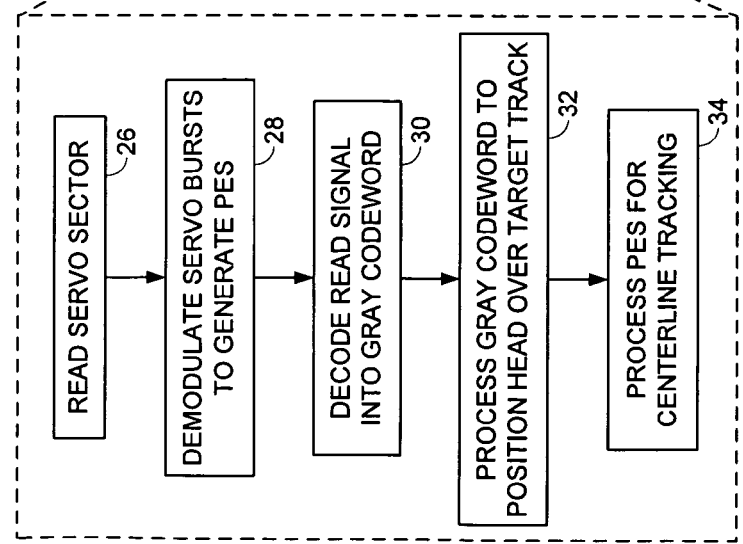
FIG. 2B is a flow diagram executed by the control circuitry for demodulating the servo bursts of a servo sector into a PES, and into a Gray codeword representing at least part of a servo track address according to an embodiment of the present invention.

FIG. 2A shows a disk drive according to an embodiment of the present invention comprising a disk 16 including a plurality of servo tracks 18 defined by a plurality of servo sectors $20_0$-$20_N$, wherein each servo sector 20 comprises a plurality of servo bursts. The disk drive further comprises a head 22 actuated over the disk 16. Control circuitry 24 executes the flow diagram of FIG. 2B wherein a servo sector is read (step 26) to generate a read signal 27 which is processed to demodulate the servo bursts into a position error signal (PES) representing an offset of the head from a target radial location on the disk (step 28). The read signal 27 is also processed to decode the servo bursts into a Gray codeword representing at least part of a servo track address (step 30), wherein the track address represents a servo track the head 22 is over. The control circuitry 24 processes the Gray codeword to position the head 22 over a target track (step 32), and processes the PES to maintain the head 22 over the target track (step 34). In the embodiment of FIG. 2A, the control circuitry 24 filters the PES using a suitable compensation filter to generate a control signal 36 applied to a voice coil motor (VCM) 38 which rotates an actuator arm 40 about a pivot in order to actuate the head 22 radially over the disk 16 in a direction that reduces the PES.

Figure 3:
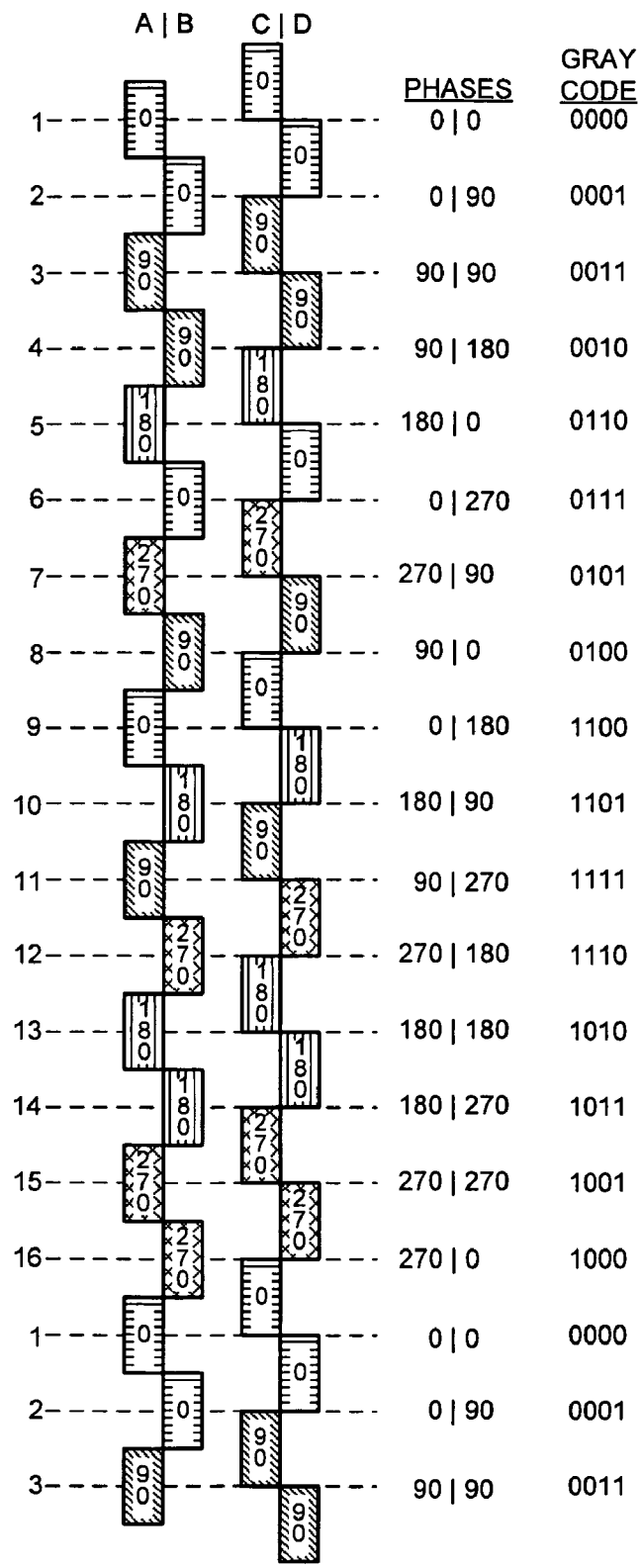
FIG. 3 shows a quadrature servo pattern wherein the phases of the servo bursts are decoded into the Gray codeword.

FIG. 3 shows a quadrature servo pattern according to an embodiment of the present invention wherein each servo burst comprises one of a plurality of phases, and the control circuitry 24 decodes the phases of the servo bursts into the Gray codeword. In the embodiment of FIG. 3, the servo burst phases comprise 0 degrees, 90 degrees, 180 degrees, and 270 degrees which are recorded in a particular sequence such that the phase of two adjacent servo bursts represent a 4-bit Gray codeword. For example, the phases 0/0 of the A/B bursts represent the Gray codeword 0000, the phases 0/90 represent the Gray codeword 0001, and so on. The C/D servo bursts are offset one-half of a servo track from the A/B servo bursts to increase the coverage of the position detection across the entire servo track, wherein the C/D servo bursts also provide redundancy for the decoded Gray codeword.

As illustrated in FIG. 3, employing four distinct phases in the servo bursts enables the encoding of 16 Gray codewords each representing at least part of the servo track address. Any suitable number of phases may be employed in the embodiments of the present invention, wherein in one embodiment the number of Gray codewords that may be encoded equals $(360/N)^m$ where m is a number of servo bursts and N is a phase step between the plurality of phases. In the example of FIG. 3, there are two servo bursts (A/B or C/D) decoded into the Gray codeword where the phase step between the plurality of phases is 90 degrees, and therefore the number of Gray codewords that may be generated equals $(360/90)^2=16$. In addition, any suitable permutation of the phases may be employed in order to encode the Gray codewords. FIG. 3 shows an example permutation, but other permutations are feasible.

Figure 5A:
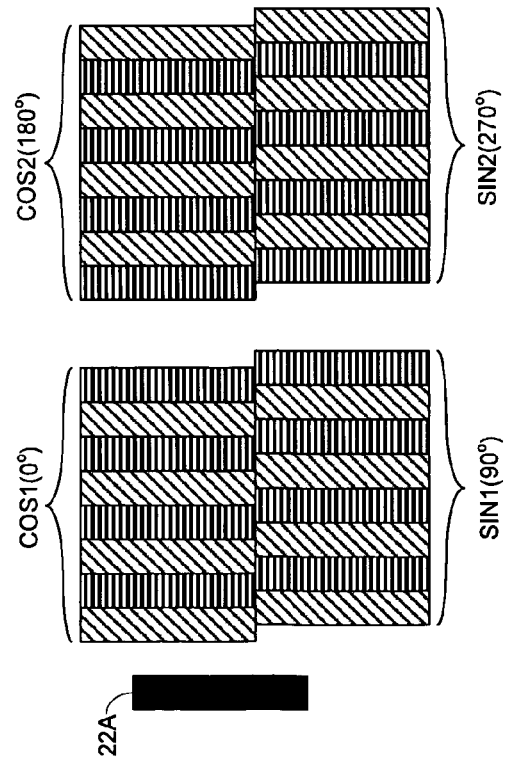
FIGS. 5A-5C illustrate how the orthogonal phase servo pattern is demodulated to generate the PES based on the cosine and sine components of the read signal.
Figure 5B:
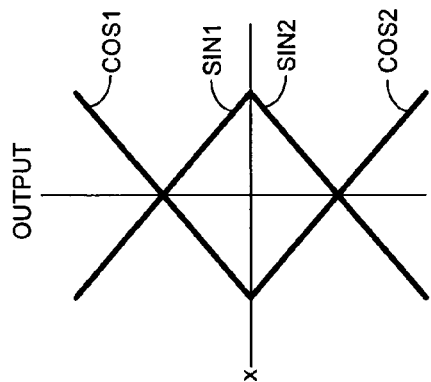
Figure 5C:
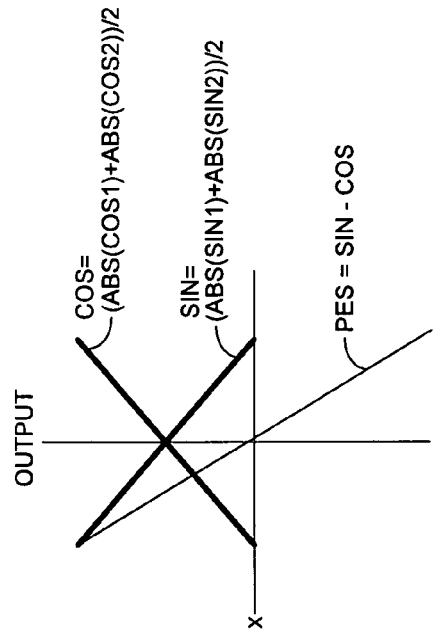

With the quadrature servo pattern of FIG. 3, the PES is generated by demodulating the amplitude of each servo burst (e.g., by integrating the read signal), and then comparing the amplitudes (e.g., PES=A-B or PES=C-D). In alternative embodiment shown in FIG. 4, the servo sectors are recorded using an orthogonal phase servo pattern, wherein the A/B and C/D servo bursts are aligned radially, and each servo burst is recorded with a phase that is offset by 90 degrees from the phase of an adjacent servo burst. The process for demodulating the orthogonal phase servo pattern of FIG. 4 is illustrated in FIGS. 5A-5C, wherein a cosine and sine component of the read signal are demodulated as the read element 22A passes over the servo bursts. As illustrated in FIG. 5C, the PES is generated as the difference between the cosine and sine components, whereas the sign of the respective cosine and sine components (as shown in FIG. 5B) is used to decode the Gray codewords. The decoding of the four phases is illustrated in FIG. 4, wherein three of the four phases are decoded into the Gray codeword. In this embodiment, the phases in both the A/B and C/D servo bursts are evaluated to extract the three phases, for example, the three phases A=0, C=0, D=90 which decodes into Gray codeword 000, the three phases B=90, D=90, C=180 decodes into Gray codeword 001, and so on.

Figure 6A:
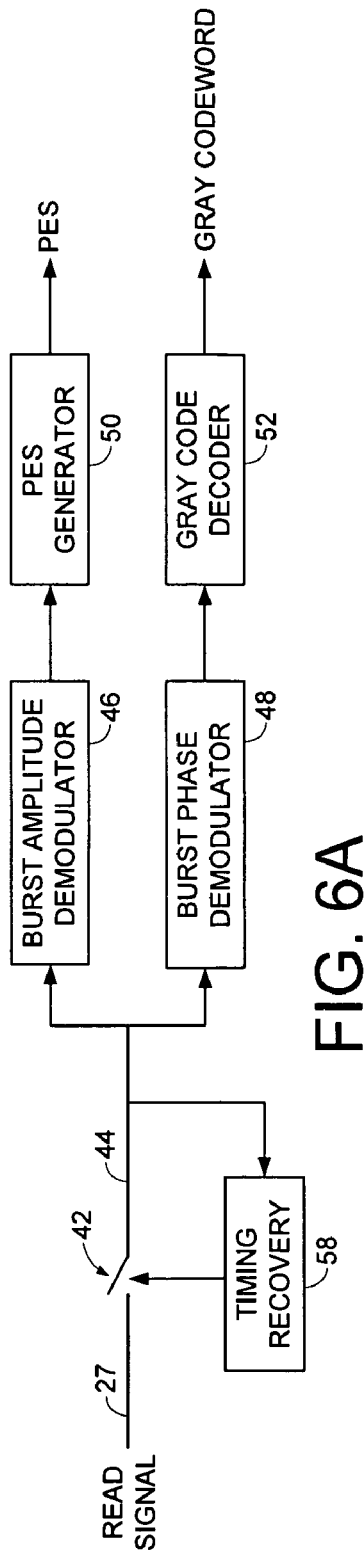
FIG. 6A shows control circuitry according to an embodiment of the present invention wherein the read signal is sampled, and the signal sample values processed by a burst amplitude demodulator and a burst phase demodulator.

Any suitable control circuitry may be employed to demodulate the servo bursts of the servo sectors to generate the PES, as well as decode the phases into the Gray codewords. FIG. 6A shows example control circuitry wherein the read signal 27 is sampled 42 to generate signal sample values 44, and the signal sample values 44 are processed by a burst amplitude demodulator 46 and a burst phase demodulator 48. The burst amplitude demodulator 46 may comprise any suitable circuitry, such as an integrator for integrating the signal sample values 44 when the servo bursts comprise a quadrature servo pattern, or a cosine/sine demodulator when the servo bursts comprise a phase based servo pattern, such as an orthogonal phase servo pattern. Similarly, the burst phase demodulator 48 may comprise any suitable circuitry, such as a cosine/sine demodulator which extracts the cosine and sine components of the signal sample values 44 at the frequency of the servo bursts. A PES generator 50 processes the output of the burst amplitude detector 46 to generate the PES, for example, by comparing the burst amplitudes for a quadrature servo pattern, or by computing the PES as shown in FIG. 5C for a phase based servo pattern, such as an orthogonal phase servo pattern. A Gray code decoder 52 processes the output of the burst phase demodulator 48 in order to decode the Gray codeword as described above.

Figure 6B:
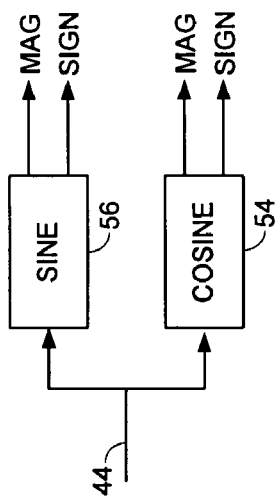
FIG. 6B shows example circuitry for demodulating the phase of the servo bursts by evaluating a cosine and sine component of the read signal.

FIG. 6B shows an embodiment wherein the burst phase demodulator comprises a cosine demodulator 54 and a sine demodulator 56 which extract the cosine and sine components (magnitude and sign) from the signal sample values 44. The cosine and sine demodulators may be implemented in any suitable manner, such as with a single point discrete time Fourier transform. In one embodiment, the burst phases for decoding the binary sequence are determined by selecting the highest magnitude of the cosine and sine demodulators, and then by evaluating the sign of the selected servo bursts. In another embodiment, the sign of both outputs of the sine and cosine demodulators are used to detect the burst phases, such as in the orthogonal phase servo pattern illustrated in FIGS. 5A-5C.

In FIG. 6A, the signal sample values 44 are synchronized to the frequency of the data recorded in the servo sectors (including the servo bursts) using a suitable timing recovery circuit 58. In the embodiment of FIG. 6A, the timing recovery circuit 58 comprises a phase locked loop which synchronizes the frequency of the sampling device 42 to the frequency of the servo data. However, any suitable timing recovery circuit 58 may be employed, such as an asynchronous sampling system employing an interpolation filter.

Figure 7:
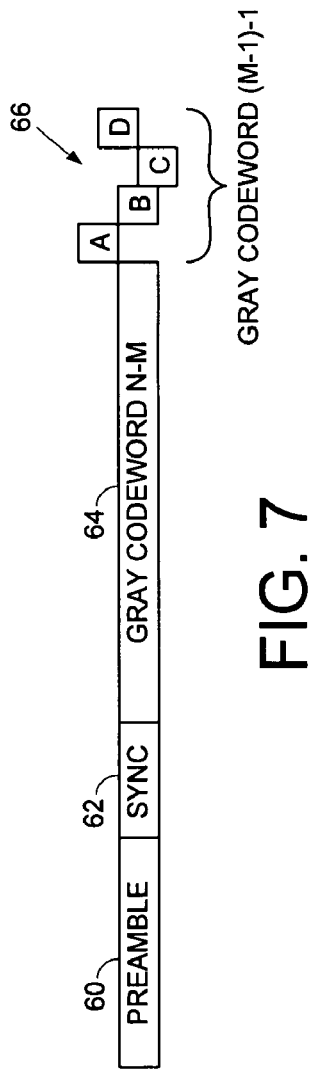
FIG. 7 shows an embodiment of the present invention wherein each servo sector further comprises a servo data field comprising a plurality of Gray coded bits.

FIG. 7 shows an embodiment of the present invention wherein each servo sector comprises a preamble 60 for storing a periodic pattern, which allows proper gain adjustment and timing synchronization of the read signal, and a sync mark 62 for storing a special pattern used to symbol synchronize to a servo data field 64 comprising a plurality of Gray coded bits of a Gray codeword. The servo track address is generated by combining the Gray code bits of the servo data field 64 with the Gray codeword of the decoded servo bursts 66. In the embodiment of FIG. 7, the Gray coded bits of the servo data field 64 represent the most significant bits of the servo track address (N-M bits), and the Gray codeword of the decoded servo bursts 66 represent the least significant bits of the servo track address. In effect, the Gray codewords of the decoded servo bursts 66 encode a band of servo tracks (e.g., 16 servo tracks in the embodiment of FIG. 3), wherein each band is identified using the Gray coded bits recorded in the servo data field 64. In this embodiment, the Gray codewords of the decoded servo bursts 66 represent part of a Gray coded servo track address. In an alternative embodiment, each band of servo tracks identified by the servo burst Gray codewords are identified using a different technique, such as an optical or magnetic decoder which may or may not output Gray coded bits.

Any suitable control circuitry may be employed to implement the flow diagrams in the embodiments of the present invention, such as any suitable integrated circuit or circuits, which may include a microprocessor executing the steps of a control program. In the embodiment where the control circuitry is implemented within a disk drive, it may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo tracks defined by a plurality of servo sectors, wherein each servo sector comprises a plurality of servo bursts;
   a head actuated over the disk; and
   control circuitry operable to:
      read a servo sector to generate a read signal;
      process the read signal to demodulate the servo bursts into a position error signal (PES) representing an offset of the head from a target radial location on the disk; and
      process the read signal to decode the servo bursts into a Gray codeword representing at least part of a servo track address, wherein the servo track address represents a servo track the head is over, wherein:

each servo burst comprises one of a plurality of phases; and the control circuitry decodes the phases of the servo bursts into the Gray codeword.

2. The disk drive as recited in claim 1, wherein the phases comprise 0 degrees, 90 degrees, 180 degrees and 270 degrees.

3. The disk drive as recited in claim 1, wherein a number of Gray codewords equals $$(360/N)^m$$

where m is a number of servo bursts and N is a phase step between the plurality of phases.

4. The disk drive as recited in claim 1, wherein:

each servo sector further comprises a servo data field comprising a plurality of Gray coded bits; and the control circuitry generates the servo track address by combining the Gray code bits of the servo data field with the Gray codeword of the decoded servo bursts.

5. The disk drive as recited in claim 4, wherein:

the Gray coded bits of the servo data field represent the most significant bits of the servo track address; and the Gray codeword of the decoded servo bursts represent the least significant bits of the servo track address.

6. The disk drive as recited in claim 1, wherein the control circuitry generates the PES in response to an amplitude of the servo bursts.

7. The disk drive as recited in claim 1, wherein the control circuitry generates the PES in response to a phase of the servo bursts.

8. The disk drive as recited in claim 1, wherein the servo bursts comprise a quadrature servo pattern.

9. The disk drive as recited in claim 1, wherein the servo bursts comprise an orthogonal phase servo pattern.

10. The disk drive as recited in claim 1, wherein at least two of the servo bursts of adjacent servo tracks are aligned radially across at least a portion of the disk.

11. A method of operating a disk drive, the disk drive comprising a disk comprising a plurality of servo tracks defined by a plurality of servo sectors, wherein each servo sector comprises a plurality of servo bursts, and a head actuated over the disk, the method comprising:

reading a servo sector to generate a read signal;

processing the read signal to demodulate the servo bursts into a position error signal (PES) representing an offset of the head from a target radial location on the disk; and processing the read signal to decode the servo bursts into a Gray codeword representing at least part of a servo track address, wherein the servo track address represents a servo track the head is over, wherein:

each servo burst comprises one of a plurality of phases; and the control circuitry decodes the phases of the servo bursts into the Gray codeword.

12. The method as recited in claim 11, wherein the phases comprise 0 degrees, 90 degrees, 180 degrees and 270 degrees.

13. The method as recited in claim 11, wherein a number of Gray codewords equals $$(360/N)^m$$

where m is a number of servo bursts and N is a phase step between the plurality of phases.

14. The method as recited in claim 11, wherein:

each servo sector further comprises a servo data field comprising a plurality of Gray coded bits; and the servo track address is decoded by combining the Gray code bits of the servo data field with the Gray codeword of the decoded servo bursts.

15. The method as recited in claim 14, wherein:

the Gray coded bits of the servo data field represent the most significant bits of the servo track address; and the Gray codeword of the decoded servo bursts represent the least significant bits of the servo track address.

16. The method as recited in claim 11, wherein the PES is generated in response to an amplitude of the servo bursts.

17. The method as recited in claim 11, wherein the PES is generated in response to a phase of the servo bursts.

18. The method as recited in claim 11, wherein the servo bursts comprise a quadrature servo pattern.

19. The method as recited in claim 11, wherein the servo bursts comprise an orthogonal phase servo pattern.

20. The method as recited in claim 11, wherein at least two of the servo bursts of adjacent servo tracks are aligned radially across at least a portion of the disk.

* * * * *